(12) United States Patent
Kim

(10) Patent No.: US 12,595,832 B2
(45) Date of Patent: Apr. 7, 2026

(54) BRAKE HOUSING

(71) Applicant: HL MANDO CORPORATION, Pyeongtaek-si (KR)

(72) Inventor: Yunhyeon Kim, Seongnam-si (KR)

(73) Assignee: HL MANDO CORPORATION, Pyeongtaek si (KR)

( * ) Notice: Subject to any disclaimer, the term of this patent is extended or adjusted under 35 U.S.C. 154(b) by 374 days.

(21) Appl. No.: 18/201,681

(22) Filed: May 24, 2023

(65) Prior Publication Data

US 2024/0133437 A1 Apr. 25, 2024
US 2024/0229881 A9 Jul. 11, 2024

(30) Foreign Application Priority Data

Oct. 21, 2022 (KR) ........................ 10-2022-0136498

(51) Int. Cl.
F16D 65/18 (2006.01)
F16D 65/00 (2006.01)
F16D 121/04 (2012.01)

(52) U.S. Cl.
CPC .......... F16D 65/18 (2013.01); *F16D 2121/04* (2013.01)

(58) Field of Classification Search
CPC .. F16D 65/18; F16D 65/0068; F16D 65/0087; F16D 2121/04; F16D 2125/04
See application file for complete search history.

(56) References Cited

U.S. PATENT DOCUMENTS

| | | | | |
|---|---|---|---|---|
| 4,039,053 A | * | 8/1977 | Meyer ............... | F16D 55/22655 |
| | | | | 188/73.45 |
| 6,044,936 A | * | 4/2000 | Matsumoto ............. | F16D 65/18 |
| | | | | 277/377 |
| 9,551,388 B2 | * | 1/2017 | Dombroski ......... | F16D 65/0068 |
| 10,883,608 B2 | * | 1/2021 | Suzuki .................... | B29C 45/14 |
| 11,486,455 B2 | * | 11/2022 | Zhang .................... | F16D 65/18 |
| 12,038,054 B2 | * | 7/2024 | Kang ................... | F16D 65/183 |
| 12,109,988 B2 | * | 10/2024 | Kim ...................... | B60T 13/588 |
| 2016/0032995 A1 | * | 2/2016 | Nishino ................. | F16D 65/18 |
| | | | | 188/72.3 |
| 2016/0146277 A1 | * | 5/2016 | Dombroski ......... | F16D 65/0068 |
| | | | | 188/72.4 |
| 2020/0141498 A1 | * | 5/2020 | Suzuki ...................... | F16J 3/04 |
| 2020/0386284 A1 | * | 12/2020 | Zhang .................. | F16D 55/226 |
| 2021/0199168 A1 | * | 7/2021 | Noguchi .............. | F16D 65/183 |
| 2021/0285508 A1 | * | 9/2021 | Osada .................. | F16D 55/226 |
| 2022/0025946 A1 | * | 1/2022 | Kim ........................ | F16J 15/18 |
| 2022/0356917 A1 | * | 11/2022 | Kang ................... | F16D 65/183 |
| 2023/0022467 A1 | * | 1/2023 | Kang ................... | F16D 65/183 |

(Continued)

FOREIGN PATENT DOCUMENTS

| | | |
|---|---|---|
| JP | 2010-127440 | 6/2010 |
| KR | 10-2007-0060520 | 6/2007 |
| KR | 10-2017-0010323 | 1/2017 |

*Primary Examiner* — Thomas W Irvin
(74) *Attorney, Agent, or Firm* — LEE, HONG, DEGERMAN, KANG & WAIMEY

(57) ABSTRACT

Disclosed herein is a brake housing. The brake housing configured such that a piston is disposed therein includes a body opened at one side thereof such that the piston is disposed therein, a support part formed on one side of the body to support the movement of the piston, and an accommodation part formed on the other side of the body to accommodate at least a portion of the piston.

12 Claims, 5 Drawing Sheets

101

(56) References Cited

U.S. PATENT DOCUMENTS

| 2023/0313855 | A1* | 10/2023 | Ebinuma | ............ | F16D 65/0068 |
| | | | | | 188/72.4 |
| 2024/0102523 | A1* | 3/2024 | Osada | ................... | B22D 25/02 |
| 2024/0328473 | A1* | 10/2024 | Shahin | ................... | F16D 65/18 |

* cited by examiner

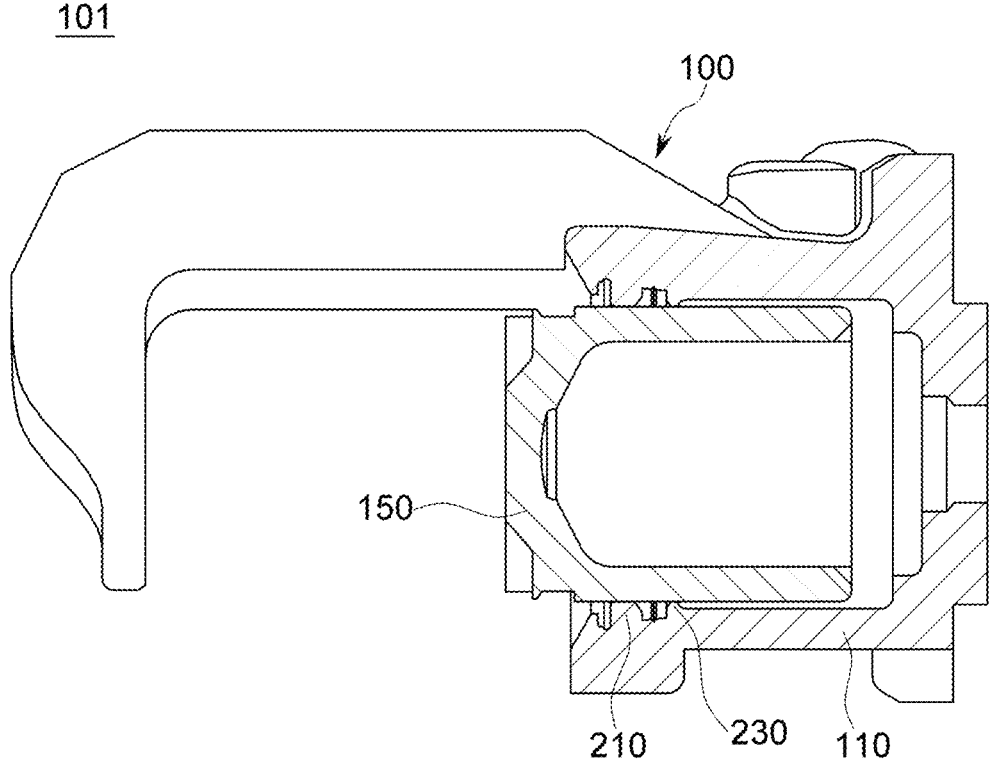
[Fig.1.]

101
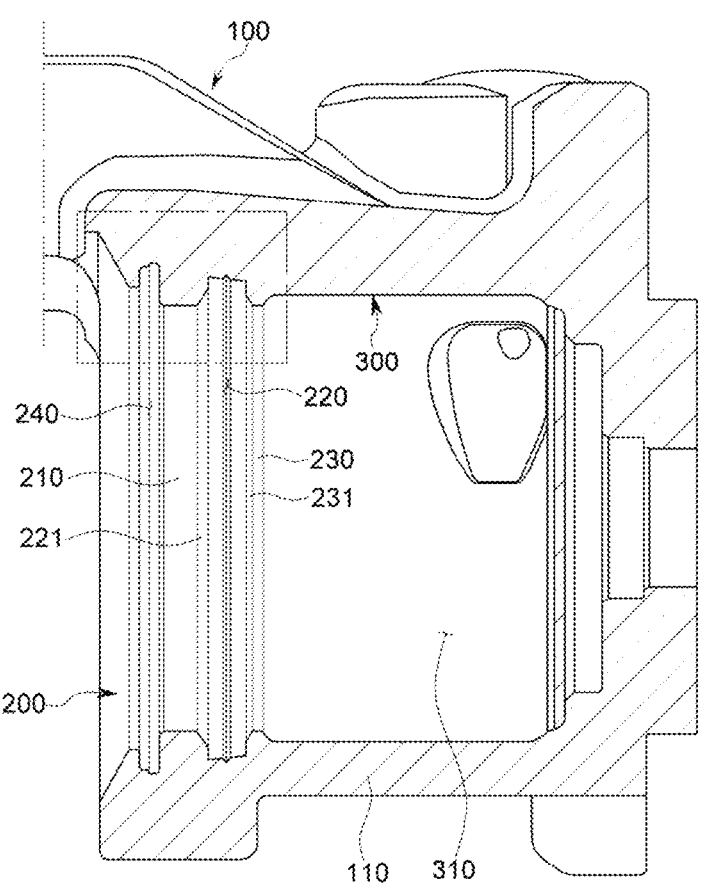
[Fig.2.]

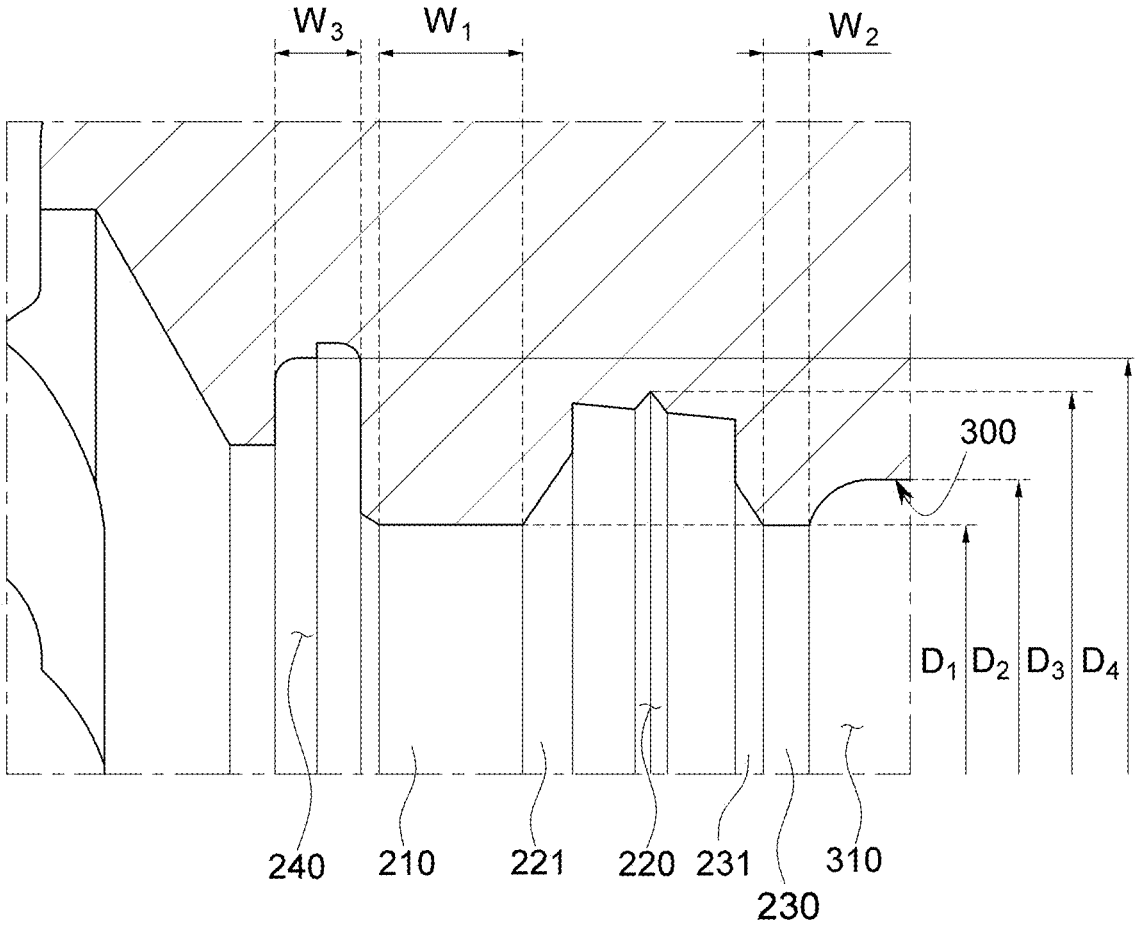
[Fig.3.]

101
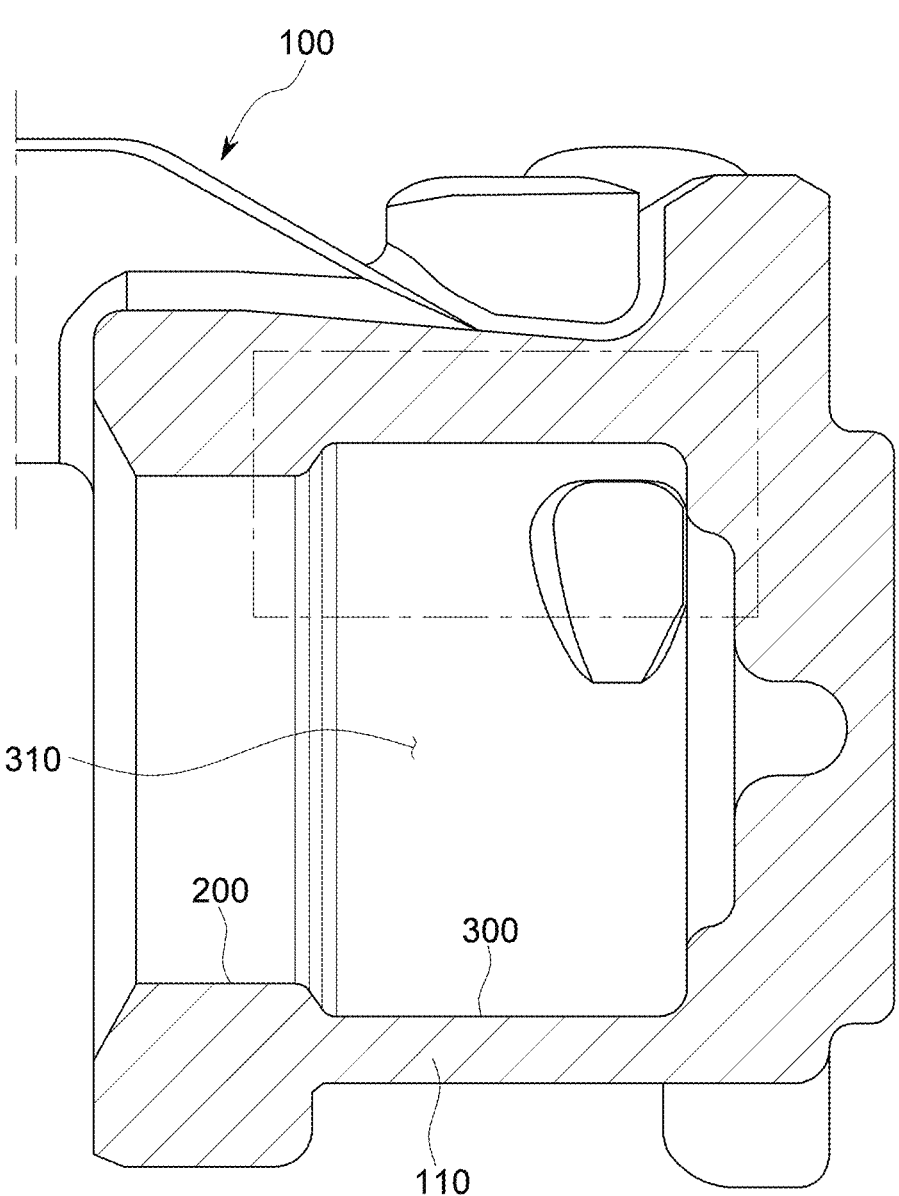
[Fig.4.]

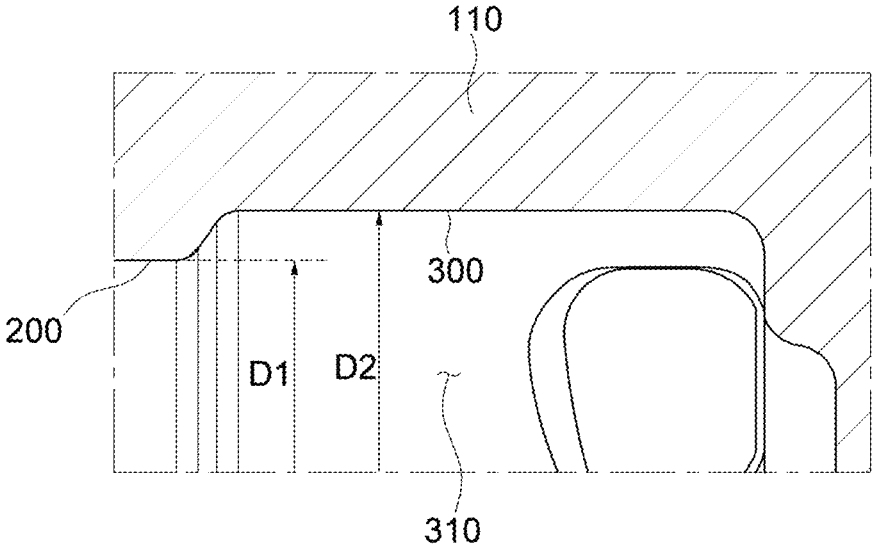
[Fig.5.]

BRAKE HOUSING

CROSS-REFERENCE TO RELATED APPLICATIONS

This application claims benefit and priority to Korean Patent Application No. 10-2022-0136498, filed on Oct. 21, 2022, with the Korean Intellectual Property Office, the disclosure of which is incorporated herein in its entirety by reference.

TECHNICAL FIELD

The present disclosure relates to a brake housing and, more particularly, to a brake housing in which a piston is disposed inside a disc brake.

BACKGROUND

Generally, a brake housing is configured such that a piston is installed therein. The brake housing is pulled out by power supplied from the piston, and pushes a pad so that a disc engages with the pad, thus providing a braking force.

In the case that the center of the piston is offset from the center of the inside of the brake housing in which the piston is installed when the piston is moved in and out, the uneven wear of the pad occurs, thereby causing a reduction in lifespan thereof.

Further, shock occurs between the inside of the brake housing and the piston. In this case, there is a problem in that the piston or the inside of the brake housing is damaged.

Therefore, a brake housing that can stably support the inward and outward movement of the piston is required.

SUMMARY

In view of the above, the present disclosure provides a brake housing that can stably support the inward and outward movement of a piston.

The present disclosure provides a brake housing configured such that a piston is disposed therein, the brake housing including a body opened at a first side thereof such that the piston is disposed therein, a support part formed on the first side of the body to support a movement of the piston, and an accommodation part formed on a second side of the body to accommodate at least a portion of the piston.

Further, an inner diameter of the support part may be formed to be relatively smaller than an inner diameter of the accommodation part.

Further, the support part may contact the piston.

The brake housing may further include a first groove disposed between the support part and the accommodation part and depressed along an inside of the body.

The brake housing may further include a partitioning part disposed between the first groove and the accommodation part to partition the first groove from the accommodation part.

Further, an inner diameter of the partitioning part may be equal to or more than an inner diameter of the support part.

The brake housing may further include a second groove spaced apart from the first groove with the grooves arranged on opposite sides of the support part, and depressed inside the body.

Further, an inner diameter of the second groove may be formed to be relatively larger than an inner diameter of the first groove.

Further, a width of the support part may be formed to be relatively smaller than a width of the partitioning part.

The brake housing may further include a first slope part formed on a side of the support part adjacent to the first groove and inclined in a direction away from the first groove.

The brake housing may further include a second slope part formed on a side of the partitioning part adjacent to the first groove, and inclined in a direction away from the first groove.

The present disclosure provides a brake housing configured such that a piston is disposed therein, the brake housing including a body having a cylinder opened at a first side thereof such that the piston is disposed therein, a first area disposed on a first side of the cylinder to support the piston, and a second area disposed on a second side of the cylinder and formed to have an inner diameter that is relatively larger than an inner circumference of a portion of the first area, thus accommodating the piston.

Further, a support part may be formed on an inner circumference of a portion of the first area to support the piston.

Further, a first groove may be formed in the first area to be adjacent to the support part, and be depressed toward an inner circumference of the cylinder.

Further, a partitioning part may be formed in the first area to be spaced apart from the support part with the partitioning part and the support part arranged on opposite sides of the first groove.

Further, a diameter of an inner circumference of the first groove may be formed to be relatively larger than a diameter of an inner circumference of the second area.

Further, a first end of the support part may contact the piston.

Further, a width of the support part may be formed to be relatively smaller than a width of the partitioning part.

Further, a second groove may be disposed in the first area to be spaced apart from the first groove with the grooves arranged on opposite sides of the support part, and be formed to have an inner diameter that is relatively larger than an inner diameter of the first groove.

Further, an inner circumference of a portion of the first area may contact the piston.

Advantageous Effects

According to an embodiment of the present disclosure, a brake housing can stably support the inward and outward movement of a piston.

Further, the offset between the center of a cylinder of a brake housing and the center of a piston can be prevented, thereby preventing the brake housing or the piston from being damaged and preventing the uneven wear of the pad.

BRIEF DESCRIPTION OF THE DRAWINGS

FIG. 1 is a diagram illustrating a portion of a brake housing according to an embodiment of the present disclosure.

FIG. 2 is a sectional view illustrating the brake housing according to an embodiment of the present disclosure.

FIG. 3 is an enlarged view illustrating an inner wall of a cylinder in an area of FIG. 2.

FIG. 4 is a sectional view illustrating a portion of casting of the brake housing according to an embodiment of the present disclosure.

FIG. 5 is an enlarged view illustrating an inner wall of a cylinder in an area of FIG. 4.

DETAILED DESCRIPTION

Hereinafter, embodiments of the present disclosure will be described in detail such that those skilled in the art can easily practice the present disclosure. However, the present disclosure may be implemented in various ways without being limited to particular embodiments described herein.

It is to be noted that drawings are schematic and are not drawn to scale. The size or shape of components shown in the drawings may be exaggerated for the clarity and convenience of description. Any dimensions are merely illustrative and not limiting. Furthermore, the same reference numerals are used throughout the drawings to designate the same or similar components.

The embodiments of the present disclosure specifically represent ideal embodiments. As a result, various variations of the diagram are expected. Therefore, the embodiment is not limited to the specific shape of an illustrated region, and also covers the modification of the shape by manufacturing.

Hereinafter, a brake housing 101 according to an embodiment of the present disclosure will be described with reference to FIGS. 1 to 5.

As shown in FIG. 1, the brake housing 101 relates to a housing of a caliper brake. Specifically, a piston 150 disposed in the brake housing 101 moves so that a pad presses a disc to provide braking force to a vehicle.

As shown in FIGS. 1 and 2, the brake housing 101 according to an embodiment of the present disclosure includes a body 100, a support part 210, and an accommodation part 310.

The body 100 is opened at a side thereof. Specifically, the body 100 is opened at a side thereof such that the piston 150 is disposed therein.

The support part 210 is formed on one side of the body 100 to support the movement of the piston 150. Specifically, the support part 210 that is an area on an inner surface of the body 100 may support the movement of the piston 150. That is, the support part 210 may be disposed on a side of the body 100 that is opened, thus supporting the movement of the piston 150.

The accommodation part 310 is formed on the other side of the body 100 to accommodate at least a portion of the piston 150. Specifically, the accommodation part 310 may be formed on the other side that is opposite to the open side of the body 100 to accommodate at least a portion of the piston 150.

Through such a configuration, the movement of the piston 150 disposed in the body 100 may be supported by the support part 210, and the piston 150 may be accommodated by the accommodation part 310.

Therefore, the brake housing 101 according to an embodiment of the present disclosure causes the piston 150 to stably move, thus providing the braking force.

Further, as shown in FIG. 3, the inner diameter $D_1$ of the support part 210 according to an embodiment of the present disclosure may be formed to be relatively smaller than the inner diameter $D_2$ of the accommodation part 310.

The inner diameter of the support part 210 may be formed to be relatively smaller than the inner diameter of the accommodation part 310, thus effectively supporting the movement of the piston 150. Specifically, the inner diameter of the support part 210 formed inside the body 100 that is opened at a side thereof may be formed to be relatively smaller than the inner diameter of the accommodation part

310, so that the support part 210 may effectively support the piston 150 that is moved to the opened side. That is, since the inner diameter of the support part 210 is formed to be relatively smaller than the inner diameter of the accommodation part 310, the support part 210 may protrude toward the piston 150 relative to the accommodation part 310 to support the movement of the piston 150.

Further, the support part 210 according to an embodiment of the present disclosure may be formed to contact the piston 150.

Since the support part 210 protrudes toward the piston 150 relative to the accommodation part 310, it may contact the outer circumference of the piston 150 when the piston 150 moves. Such a support part 210 can improve the behavior stability of the piston 150 when it moves in a longitudinal direction.

That is, the support part 210 may contact the outer circumference of the piston 150 and may guide the movement of the piston 150, thus solving a problem due to a change in central axis of the piston 150, which may be caused by the movement of the piston 150.

The brake housing 101 according to an embodiment of the present disclosure may further include a first groove 220.

The first groove 220 may be disposed between the support part 210 and the accommodation part 310. Further, the first groove 220 may be depressed along the inner circumference of the body 100 in an inner area of the body 100. Specifically, an airtight member may be installed in the first groove 220. That is, the airtight member such as a rubber seal may be received in the first groove 220.

For instance, a central portion of the first groove 220 may be further depressed by the shape of a tool during processing. Further, the airtight member may be installed in the first groove 220 to maintain airtightness. The airtight member may be installed in the first groove 220 to maintain the airtightness of the accommodation part 310 as the piston 150 moves.

The brake housing 101 according to an embodiment of the present disclosure may further include a partitioning part 230.

The partitioning part 230 may be disposed between the first groove 220 and the accommodation part 310. The partitioning part 230 may partition the first groove 220 from the accommodation part 310. Specifically, one side of the partitioning part 230 may define one area of the first groove 220, while the other side may define the accommodation part 310. That is, the partitioning part 230 may be an area that partitions one side and the other side of the body 100.

Further, the inner diameter of the partitioning part 230 according to an embodiment of the present disclosure may be equal to or more than the inner diameter of the support part 210.

Since the partitioning part 230 is smaller in inner diameter than the first groove 220 and the accommodation part 310, it may protrude into the body 100 relative to the first groove 220 and the accommodation part 310. That is, the partitioning part 230 may be disposed to be relatively adjacent to the central portion of the body 300 relative to the first groove 220 and the accommodation part 310.

The inner diameter of the partitioning part 230 may be formed to be equal to or greater than the inner diameter of the support part 210. Therefore, if the inner diameter of the partitioning part 230 is formed to be the same as the inner diameter of the support part 210, a surface of the partitioning part 230 may also support the movement of the cylinder 110.

The partitioning part 230 and the support part 210 may support the outer circumference of the piston 150, thereby effectively supporting the movement of the piston 150 and effectively preventing the center of the piston 150 from being offset from the center of the inside of the body 100.

The brake housing 101 according to an embodiment of the present disclosure may further include a second groove 240.

The second groove 240 may be spaced apart from the first groove 220 with the grooves arranged on opposite sides of the support part 210. The second groove 240 may be circumferentially depressed in the other area of a side of the body 100. Specifically, the second groove 240 may be disposed in the body 100 to be spaced apart from the first groove 220. The second groove 240 may be disposed relatively closer to one open end of the body 100 than the first groove 220. Further, the second groove 240 may provide an installation space to install an airtight member different from that installed in the first groove 220.

Further, as shown in FIG. 3, the inner diameter $D_4$ of the second groove 240 according to an embodiment of the present disclosure may be formed to be relatively larger than the inner diameter $D_3$ of the first groove 220.

The second groove 240 may be depressed to be relatively deeper into the body 100 than the first groove 220. Specifically, the second groove 240 may be formed to be relatively deeper than the first groove 220 to provide an installation space in which the airtight member is installed.

The airtight member installed in the second groove 240 may be stretched from the body 100 when the piston 150 moves. Specifically, the second groove 240 may provide an installation space to accommodate a side of the airtight member that may be stretched together when the piston 150 moves. That is, the airtight member that is accommodated at one side thereof in the second groove 240 may cover the piston 150 and the open area of the body 100, thus preventing foreign substances from entering the body 100 as the piston 150 moves.

For instance, a boot may be installed in the second groove 240.

Further, a width $W_1$ at which the support part 210 of the brake housing 101 according to an embodiment of the present disclosure supports the piston 150 may be formed to be relatively larger than a width $W_3$ of the second groove 240.

As shown in FIG. 3, the width $W_1$ (the same direction as the longitudinal direction of the piston 150) of one end of the support part 210 supporting the piston 150 may be formed to be relatively larger than the width $W_3$ of the second groove 240.

Therefore, the support part 210 may effectively support the movement of the piston 150.

Further, as shown in FIG. 3, the brake housing 101 according to an embodiment of the present disclosure may further include a first slope part 221.

The first slope part 221 may be formed on a side of the support part 210 adjacent to the first groove 220. Further, the first slope part 221 may be inclined in a direction away from the first groove 220. Specifically, the first slope part 221 may be disposed in a direction where an area of one side defining the first groove 220 is inclined such that the width of the open area of the first groove 220 is increased toward one end of the support part 210.

That is, the first slope part 221 may be formed such that an area of one side defining the first groove 220 is inclined in a direction where the piston 150 is moved out of the body 100.

Such a first slope part 221 may prevent the airtight member inserted into the first groove 220 from interfering with the movement of the piston 150. That is, the first slope part 221 may limit the movement of the airtight member inserted into the first groove 220.

As shown in FIG. 3, the brake housing 101 according to an embodiment of the present disclosure may further include a second slope part 231.

The second slope part 231 may be formed on a side of the partitioning part 230 adjacent to the first groove 220. Further, the second slope part 231 may be inclined in a direction away from the first groove 220. Specifically, the second slope part 231 may be disposed in a direction where an area of the other side defining the first groove 220 is inclined such that the width of the open area of the first groove 220 is increased toward one end of the partitioning part 230.

That is, the second slope part 231 may be formed such that an area of the other side defining the first groove 220 is inclined in a direction where the piston 150 is moved into the body 100. That is, the second slope part 231 may be formed in a direction in which it intersects the first slope part 221.

Such a second slope part 231 may prevent the airtight member inserted into the first groove 220 from interfering with the movement of the piston 150. That is, the second slope part 231 may limit the movement of the airtight member inserted into the first groove 220.

Further, as shown in FIG. 4, the brake housing 101 according to an embodiment of the present disclosure may include a body 100 in which a cylinder 110 is formed, a first area 200, and a second area 300. The first area 200 and the second area 300 are formed on the inner circumference of the cylinder 110.

As shown in FIGS. 4 and 1, the hollow cylinder 110 that is opened at a side thereof is formed in the body 100. Specifically, the piston 150 is disposed in the cylinder 110.

The first area 200 is disposed on a side of the cylinder 110. Further, the inner circumference of a portion of the first area 200 may support at least the piston 150. Specifically, the first area 200 is disposed on the open side of the cylinder 110.

That is, the inner circumference of a portion of the first area 200 may be formed to have an inner diameter that is relatively smaller than that of the inner circumference of the second area 300, and the inner circumference of a portion of the first area 200 may contact the piston 150 to support the inward and outward movement of the piston 150.

At this time, the inner circumference of a portion of the first area 200 may be the above-described support part 210.

The second area 300 is disposed on the other side of the cylinder 110. Further, the second area 300 may accommodate at least a portion of the piston 150. Furthermore, the second area 300 may be disposed relatively farther from the open surface of the cylinder 110 than the first area 200.

The inner diameter of the second area 300 may be formed to be relatively larger than the diameter of the inner circumference of a portion of the first area 200. Specifically, a portion of the first area 200 may be formed to have the inner diameter that is relatively smaller than the inner diameter of the second area 300. That is, a portion of the first area 200 may protrude toward the center of the cylinder 110 relative to the second area 300.

Specifically, the accommodation part 310 may be defined in the second area 300 to accommodate at least a portion of the piston 150. Of the entire area of the cylinder 110, the range of the second area 300 may be larger than that of the first area 200.

For instance, the inner diameter of the second area 300 may be formed to be relatively larger than the outer diameter of the piston 150.

As shown in FIG. 5, the brake housing 101 in which the first area 200 and the second area 300 are formed to have a step therebetween may be produced through casting or the like. Due to the second region 300 having an inner diameter more depressed than the first area 200, the weight of the brake housing 101 according to the present disclosure can be reduced compared to the prior art, and thus material costs can be reduced.

Thereafter, as shown in FIGS. 3 and 4, the first groove 220 and the second groove 240 may be machined in the first area 200 by machining the inside of the cylinder 110. Specifically, the support part 210 may be disposed in the first area 200 to support the first groove 220, the second groove 240, and the piston 150. Further, the partitioning part 230 may also be disposed in the first area 200.

That is, the first area 200 and the second area 300 may be formed on the inner circumference in the cylinder 110, and the first groove 220, the second groove 240, the support part 210, and the partitioning part 230 may also be formed in the first area 200.

As shown in FIG. 3, the support part 210 and the partitioning part 230 may be disposed in the first area 200 on opposite sides of the first groove 220 to be spaced apart from each other.

Further, the first groove 220 and the second groove 240 may be disposed in the first area 200 on opposite sides of the support part 210 to be spaced apart from each other.

Further, as shown in FIG. 3, the width $W_2$ of the partitioning part 230 may be formed to be relatively smaller than the width $W_1$ of the support part 210 supporting the piston 150.

The width of the partitioning part 230 may be relatively larger than that of the partitioning part 230, so that the partitioning part 230 can effectively support the movement of the piston 150 that moves into and out of the cylinder 110.

Specifically, the width of the partitioning part 230 may be formed to be relatively larger than that of the second groove 240.

As described above, the brake housing 101 according to an embodiment of the present disclosure allows a portion of the first area 200 to support the movement of the piston 150, thus ensuring the behavior stability of the piston 150. Thus, the brake housing 101 of the present disclosure can also solve the uneven wear of the pad pressed by the piston 150 due to the unstable behavior of the piston 150.

Although the embodiments of the present disclosure have been described with reference to the accompanying drawings, those skilled in the art to which the present disclosure pertains will understand that the present disclosure can be carried out in different forms without changing the technical spirit or essential features.

Therefore, the above-described embodiments should be understood as illustrative and not restrictive in all respects, and the scope of the present disclosure is defined by the claims that will be described later. All changes or modifications derived from the meaning and scope of the claims and their equivalent concepts should be construed as being included in the scope of the present disclosure.

DETAILED DESCRIPTION OF MAIN ELEMENTS

100: body
101: brake housing
110: cylinder
150: piston
200: first area
210: support part
220: first groove 221: first slope part
230: partitioning part
231: second slope part
240: second groove
300: second area
310: accommodation part

What is claimed is:

1. A brake housing configured such that a piston is disposed therein, the brake housing comprising:
a body opened at a first side thereof such that the piston is disposed therein;
a support part formed on the first side of the body to support a movement of the piston,
wherein the support part contacts the piston;
an accommodation part formed on a second side of the body to accommodate at least a portion of the piston;
a first groove disposed between the support part and the accommodation part, and depressed along an inside of the body; and
a partitioning part disposed between the first groove and the accommodation part to partition the first groove from the accommodation part,
wherein an inner diameter of the partitioning part is equal to or more than an inner diameter of the support part, and a width of the partitioning part is smaller than a width of the support part.

2. The brake housing of claim 1, wherein an inner diameter of the support part is formed to be relatively smaller than an inner diameter of the accommodation part.

3. The brake housing of claim 1, further comprising:
a second groove spaced apart from the first groove with the first and second grooves arranged on opposite sides of the support part, and depressed inside the body.

4. The brake housing of claim 3, wherein an inner diameter of the second groove is formed to be relatively larger than an inner diameter of the first groove.

5. The brake housing of claim 1, wherein a width of the support part is formed to be relatively smaller than a width of the partitioning part.

6. The brake housing of claim 1, further comprising:
a first slope part formed on a side of the support part adjacent to the first groove, and inclined in a direction away from the first groove.

7. The brake housing of claim 1, further comprising:
a second slope part formed on a side of the partitioning part adjacent to the first groove, and inclined in a direction away from the first groove.

8. A brake housing configured such that a piston is disposed therein, the brake housing comprising:
a body having a cylinder opened at a first side thereof such that the piston is disposed therein;
a first area disposed on a first side of the cylinder to support the piston; and
a second area disposed on a second side of the cylinder, and formed to have an inner diameter that is relatively larger than an inner circumference of a portion of the first area, thus accommodating the piston, wherein:
a support part is formed on an inner circumference of a portion of the first area to support the piston, the support part contacts the piston;
a first groove is formed in the first area to be adjacent to the support part, and is depressed toward an inner circumference of the cylinder;
a partitioning part is formed in the first area to be spaced apart from the support part with the partitioning part and the support part arranged on opposite sides of the first groove;

a second groove is disposed in the first area to be spaced apart from the first groove with the first and second grooves arranged on opposite sides of the support part, and the second groove is formed to have an inner diameter that is relatively larger than an inner diameter of the first groove;

a first slope part is formed on a side of the support part adjacent to the first groove, and inclined in a direction away from the first groove; and a second slope part is formed on a side of the partitioning part adjacent to the first groove, and inclined in a direction away from the first groove.

9. The brake housing of claim 8, wherein a diameter of an inner circumference of the first groove is formed to be relatively larger than a diameter of an inner circumference of the second area.

10. The brake housing of claim 8, wherein a first end of the support part contacts the piston.

11. The brake housing of claim 8, wherein a width of the support part is formed to be relatively smaller than a width of the partitioning part.

12. The brake housing of claim 8, wherein an inner circumference of a portion of the first area contacts the piston.

* * * * *